United States Patent Office 3,422,153
Patented Jan. 14, 1969

3,422,153
NOVEL ARYL-SUBSTITUTED PROPENES
AND DERIVATIVES
Jack Mills and William Pfeifer, Indianapolis, Ind., assignors to Eli Lilly and Company, Indianapolis, Ind., a corporation of Indiana
No Drawing. Filed Mar. 9, 1966, Ser. No. 532,875
U.S. Cl. 260—612       6 Claims
Int. Cl. A61k 25/00

ABSTRACT OF THE DISCLOSURE

Novel aryl-substituted propenes and derivatives and methods for their preparation, said novel compounds useful in lowering serum cholesterol and triglyceride levels in animals.

---

This invention relates to novel aryl-substituted propenes and derivatives thereof and to methods for their preparation. More particularly, this invention relates to compounds of the formula:

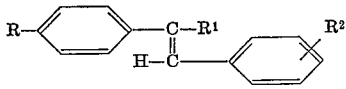

wherein
R is phenoxy or phenyl;
$R^1$ is methyl, hydroxymethyl, $(C_1-C_4)$alkanoyloxymethyl, aminomethyl, lower-alkylaminomethyl, di-lower-alkylaminomethyl, or $C_3-C_6$ cycloalkylaminomethyl; and
$R^2$ is hydrogen, halo, methyl, or methoxy.

$(C_1-C_4)$alkanoyl can be illustratively acetyl, propionyl, butyryl, and isobutyryl.

Lower alkyl can be illustratively methyl, ethyl, n-propyl, and isopropyl.

$C_3-C_6$ cycloalkyl means saturated cyclic aliphatic hydrocarbon radicals having 3 to 6 carbons in the ring and can be illustartively cyclopropyl, cyclobutyl, cyclopentyl, and cyclohexyl.

Halo can be illustratively bromo, chloro, iodo, or fluoro.

The novel compounds of this invention have useful pharmacological properties. They reduce serum cholesterol and triglyceride levels in rats when administered at rates of from about 0.005 percent to about 0.25 percent of the diet.

Compounds coming within the scope of the generic formula, supra, include, but are not limited to the following:

1-phenyl-2-(4-biphenylyl)-1-propene
1-(4-methoxyphenyl)-2-(4-biphenyl)-1-propene
1-(4-bromophenyl)-2-(4-phenoxyphenyl)-1-propene
1-(3-methylphenyl)-2-(4-biphenyly)-1-propene
1-(3-chlorophenyl)-2-(4-phenoxyphenyl)allyl alcohol
1-(4-methylphenyl)-2-(4-biphenyl)allyl alcohol
3-(4-bromophenyl)-2-(4-biphenlyl)allylamine
N-methyl-3-(4-bromophenyl)-2-(4-biphenyl)allylamine
N,N-diethyl-3-(4-methoxyphenyl)-2-(4 - phenoxyphenyl)-allylamine, and the like.

The active compounds of this invention are readily formulated for oral administration by admixture with suitable excipients and manufactured by known means into tablets, capsules, suspensions, emulsions, dispersible powders, syrups, elixirs, and the like.

The novel aryl-substituted propenes of this invention are prepared in good yield by the following stepwise synthesis: An appropriately substituted benzyl halide is converted into a Grignard reagent and reacted with an appropriately substituted acetophenone to yield a substituted propyl alcohol, which is dehydrated in boiling xylene containing a catalytic amount of p-toluenesulfonic acid to yield the desired aryl-substituted propene-1.

In a specific example of the synthesis, diphenyl ether is allowed to react with acetyl chloride in the presence of anhydrous aluminum chloride in a standard Friedel-Craft reaction to yield 4-phenoxyacetophenone. The 4-phenoxyacetophenone is allowed to react with a Grignard reagent, prepared in the usual manner from p-chlorobenzyl chloride and magnesium, to yield 1-(4-chlorophenyl) - 2 - (4 - phenoxyphenyl)propanol-2. The crude propanol thus obtained is then dehydrated by refluxing in boiling xylene containing a catalytic amount of p-toluenesulfonic acid to yield 1-(4-chlorophenyl)-2-(4-phenoxyphenyl)propene-1.

The aryl-substituted propene-1 thus prepared can be further converted to the aryl-substituted allyl bromide according to the procedure of W. Thielheimer [Synthetic Methods of Organic Chemistry, 2, 491 (1949)]. The conversion is accomplished by refluxing a mixture of the aryl-substituted propene-1, N-bromosuccinimide, and a small amount of benzoyl peroxide in an inert solvent such as carbon tetrachloride while exposing the reaction mixture to intense illumination. The aryl-substituted allyl bromide thus obtained is allowed to react with potassium acetate in glacial acetic acid at reflux temperature to replace the bromide ion and yield the aryl-substituted acrylyl acetate. This acetate can be readily hydrolyzed by refluxing with potassium or sodium hydroxide in ethanol solution to yield the aryl-substituted allyl alcohol.

Alternatively, the aryl-substituted allyl bromide can be reacted with potassium phthalimide to yield the substituted phthalimide, which can be hydrolyzed to the aryl-substituted allylamine, another compound of the present invention.

The mono- and disubstituted aminomethyl compounds are obtained by allowing the aryl-substituted allyl bromide to react with a primary or a secondary amine in the presence of an excess of an acid acceptor such as triethylamine to take up the hydrogen bromide formed in the reaction. The desired product can be obtained in the form of its hydrogen halide addition salt.

The following examples describe in detail certain compounds illustrative of the present invention and methods for the preparation thereof. However, the invention is not to be construed as limited thereto, since it will be apparent to those skilled in the art that many modifications both of materials and methods may be practiced within the spirit of this disclosure.

EXAMPLE 1

1-(4-chlorophenyl)-2-(4-phenoxyphenyl)propene-1

To 400 g. (3 moles) of anhydrous aluminum chloride were added with stirring 1500 g. (8.9 moles) of diphenyl ether, and the mixture stirred for 15–20 minutes, followed by the addition dropwise, with continued stirring of 240 g. (3 moles) of acetyl chloride. When the addition was complete, the reaction mixture was stirred overnight at ambient room temperature.

The reaction product mixture was poured into one liter of ice containing 500 ml. of concentrated hydrochloric acid. The aqueous acidic mixture was extracted with one liter of benezne. The benzene layer was washed successively with dilute aqueous sodium hydroxide solution and 500 ml. of distilled water, dried, concentrated in vacuo, and distilled to yield 4-phenoxyacetophenone having a boiling point of about 119–120° C. at 0.03 mm.;

$$n_D^{25} = 1.5955$$

A Grignard reagent was prepared in the usual manner from 644 g. (4 moles) of p-chlorobenzyl chloride and 97.2 g. (4 gram-atoms) of magnesium turnings in 250 ml. of anhydrous ether. To the Grignard reagent was added a solution of 424.4 g. (2 moles) of 4-phenoxyacetophenone in 1 liter of ether over a period of 6 hours. The reaction mixture was stirred another 10 hours at ambient room temperature.

The reaction product mixture was carefully poured into 2 liters of a mixture of ice and 500 ml. of concentrated hydrochloric acid. The aqueous acidic mixture was extracted with 750 ml. of a 1:1 mixture of ether and benzene. The ether-benzene extract was washed to neutrality with distilled water, dried, and concentrated to dryness in vacuo to yield crude 1-(4-chlorophenyl)-2-(4-phenoxyphenyl)propanol-2.

The crude propanol, supra, was dehydrated by dissolving it in 600 ml. of xylene, adding a catalytic amount of p-toluenesulfonic acid, and refluxing for about 16 hours, the water formed by the reaction being collected in a Dean-Stark trap. The reaction product mixture was concentrated in vacuo to dryness and the residue recrystallized from ethanol to yield 1-(4-chlorophenyl)-2-(4-phenoxyphenyl)propene-1 as a solid having a melting point of about 90–91° C. Yield: 500.7 g. or 79 percent.

Following the general procedure outlined in Example 1 and using appropriate starting materials, the following compounds were prepared:

1 - (4 - chlorophenyl) - 2-(4-chlorophenyl)propene-1. Melting point: 106.5–107° C.

1 - (4 - chlorophenyl)-2-(biphenylyl)propene-1. Melting point: 150.5–151° C.

1 - (4 - chlorophenyl) - 2 - [4-(4-chlorophenoxy)phenyl]propene-1. Melting point: 112–115° C.

1 - ( 4 -methoxyphenyl) - 2 - (4-phenoxyphenyl)propene-1. Melting point: 104–105° C.

1 - phenyl - 2 - (4 - phenoxyphenyl)propene-1. Melting point: 86–87° C.

1 - (4 - methylphenyl) - 2 - (4-phenoxyphenyl)propene-1. Melting point: 96–97° C.

1 - ( 3 -chlorophenyl) - 2 - (4-phenoxyphenyl)propene-1. Boiling point: 190° C./0.05 mm.; $n_D^{25} = 1.6379$–1.6420.

EXAMPLE 2

3-(4-chlorophenyl)-2-(4-phenoxyphenyl)allyl alcohol

To a refluxing, illuminated mixture of 149.0 g. (0.46 mole) of 1 - (4-chlorophenyl)-2-(4-phenoxyphenyl)propene-1 and 500 ml. of carbon tetrachloride were added a catalytic amount of benzoyl peroxide and 82.0 g. (0.46 mole) of N-bromosuccinimide; and the mixture was refluxed over the weekend. The reaction product mixture was cooled and filtered. The solid material thus obtained had a melting point of about 54–57° C. and was identified as 3-(4-chlorophenyl)-2-(4-phenoxyphenyl)allyl bromide.

A mixture of the 3-(4-chlorophenyl)-2-(4-phenoxyphenyl)allyl bromide obtained above and 119 g. (0.29 mole) of potassium acetate in 300 ml. of glacial acetic acid was refluxed overnight. The reaction product mixture was filtered and the filtrate concentrated in vacuo to dryness. The residue thus obtained was identified by physical chemical means as 3-(4-chlorophenyl)-2-(4-phenoxyphenyl)acrylyl acetate.

The acetate prepared above was refluxed with a mixture of 5 percent potassium hydroxide in ethanol to yield 3-(4-chlorophenyl)-2-(4-phenoxyphenyl)allyl alcohol having a melting point of 70–72° C.

Following the general procedure of Example 2 and using appropriate reactants, the following compounds were prepared:

3 - (4 - chlorophenyl)-2-(4-biphenylyl)acrylyl acetate. Melting point: 128–130° C.

3 - (4 - chlorophenyl) - 2-(4-biphenylyl)allyl alcohol. Melting point: 134–135° C.

3 - phenyl - 2 - (4 - phenoxyphenyl)allyl alcohol. Melting point: 89–90° C.

EXAMPLE 3

N-cyclopropyl-3-(4-chlorophenyl)-2-(4-phenoxyphenyl) allylamine

A mixture of 25.0 g. (0.063 mole) of 1-(4-chlorophenyl)-2-(4-phenoxyphenyl)allyl bromide, 7.1 g. (0.126 mole) of cyclopropylamine, and 250 ml. of triethylamine was refluxed overnight. The reaction product mixture was filtered and unreacted triethylamine removed in vacuo. The residue was dissolved in ether, the ether solution extracted with aqueous 10 percent hydrochloric acid, and the ether layer discarded. The acidic aqueous layer was basified and extracted with ether; and the ether solution was washed with water, dried, and saturated with anhydrous hydrogen chloride gas. The precipitate which formed was triturated with acetone and recrystallized from a mixture of ethanol, acetone, and ether to yield N - cyclopropyl-3-(4-chlorophenyl)-2-(4-phenoxyphenyl) allylamine hydrochloride as a solid having a melting point of 163–165.5° C.

EXAMPLE 4

3-(4-chlorophenyl)-2-(4-phenoxyphenyl)allylamine

A mixture of 13.0 g. (0.07 mole) of potassium phthalimide, 26.2 g. (0.065 mole) of 3-(4-chlorophenyl)-2-(4-phenoxyphenyl)allyl bromide, and 300 ml. of acetone was stirred and refluxed overnight. The reaction product mixture, comprising essentially N-[3-(4-chorophenyl)-2-(4-phenoxyphenyl)allyl]phthalimide, was concentrated to dryness in vacuo.

A mixture of 1 g. of the residue, 3 ml. of hydrazine hydrate, and 25 ml. of 50 percent aqueous ethanol was refluxed for about 4 hours. The reaction product mixture was cooled, concentrated in vacuo to remove the solvent alcohol, and acidified with aqueous concentrated hydrochloric acid. The aqueous acidic layer was separated and washed with about 250 ml. of ether and the washings discarded. The aqueous acidic layer was basified with aqueous 50 percent sodium hydroxide solution and extracted with several volumes of ether. The ether layer was washed to neutrality with distilled water, dried, and saturated with dry hydrogen chloride gas. The solid material thus obtained was filtered off, recrystallized from methylcyclohexane, and identified as 3-(4-chlorophenyl)-2-(4-phenoxyphenyl)allylamine hydrochloride, having a melting point of about 168–170° C.

We claim:
1. A compound of the formula:

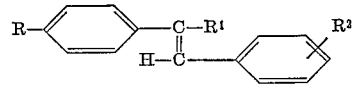

wherein
R is phenoxy or phenyl;
R¹ is methyl, hydroxymethyl; and
R² is hydrogen, halo, methyl, or methoxy.

2. A compound as in claim 1, said compound being 1-(4-chlorophenyl)-2-(4-phenoxyphenyl)-1-propene.

3. A compound as in claim 1, said compound being 1-phenyl-2-(4-phenoxyphenyl)-1-propene.

4. A compound as in claim 1, said compound being 1-(3-chlorophenyl)-2-(4-phenoxyphenyl)-1-propene.

5. A compound as in claim 1, said compound being 2-(4-phenoxyphenyl)-3-phenylallyl alcohol.

6. A compound as in claim 1, said compound being 3-(4-chlorophenyl)-2-(4-biphenylyl)allyl alcohol.

References Cited

UNITED STATES PATENTS

| 2,346,048 | 4/1944 | Rohrmann | 260—613 |
| 2,346,049 | 4/1944 | Rohrmann | 260—613 |
| 3,124,585 | 3/1964 | Burckhalter | 167—65.5 |
| 3,142,683 | 7/1964 | Dice et al. | 167—65.5 |

BERNARD HELFIN, Primary Examiner.

U.S. Cl. X.R.

260—269, 488, 568, 570.5, 613, 618, 649, 668, 999